Patented Dec. 13, 1938

2,140,481

UNITED STATES PATENT OFFICE 2,140,481

INSECTICIDE

William Gordon Rose, College Park, Md., and Herbert L. J. Haller, Washington, D. C.; dedicated to the free use of the People in the territory of the United States of America No Drawing. Application January 28, 1938, Serial No. 187,570

2 Claims. (Cl. 167—22)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the People in the territory of the United States to take effect on the granting of a patent to us.

This invention relates to improvements in materials for destroying or checking the growth or multiplication of living organisms, whether plant or animal, which are economically injurious to man.

An object of our invention is to provide a material suitable for use as an insecticide.

Another object of our invention is to provide a material which is relatively non-toxic to man and domestic animals when taken by mouth, and which can be used in place of lead arsenate, and other arsenicals for destroying insects, without leaving a harmful residue on fruits and vegetables.

We have found that organic compounds prepared by the replacement of one or more of the hydroxyl groups in pentaerythritol by halogen atoms, such as fluorine, chlorine, bromine or iodine are effective in killing many species of insects whether applied externally or internally; that these organic products may be sprayed or dusted upon vegetation without injuring it. Suitable products, according to this invention, are the pentaerythrityl halides and the pentaerythrityl halohydrins of the formula

$C(CH_2X)_4$ or $(CH_2X)_nC(CH_2OH)_{4-n}$ where X may be fluorine, chlorine, bromine or iodine atoms and $n$ may be 1, 2 or 3.

One of the preferred compounds comprised in our invention is pentaerythrityl bromide. This substance is made by heating pentaerythritol with phosphorous tribromide at a temperature of 170–180° C. Pentaerythrityl bromide is a colorless, crystalline solid that melts at 163° C.; it is insoluble in water but is soluble in organic solvents. The compound may be reduced to an impalpable powder by grinding and applied to vegetation either dry as a dust, or wet as a spray. The finely powdered substance may be incorporated as a component of an oil emulsion spray. Pentaerythrityl bromide may also be applied by dissolving it in acetone and pouring the acetone solution into water, whereupon a fine colloidal precipitate is formed. This may be applied directly to plants, or it may be combined with a suitable wetting agent and then sprayed.

Examples of other compounds comprised in our invention are pentaerythrityl trichlorohydrin (Fecht, Berichte der Deutschen Chemischen Gesellschaft (1907), vol. 40, p. 3888) and pentaerythrityl dibromohydrin, (Zelinsky and Krawetz, Berichte der Deutschen Chemischen Gesellshaft (1913), vol. 46, p. 163) both of which are colorless solids melting at 80° and 112° C., respectively.

The value of pentaerythrityl bromide as an insecticide is shown by the following tests.

1. Upon the cross-striped cabbage worm, as a dust in a concentration of 0.125 mg. per sq. cm. of foliage, the mortality after 48 hours was 89 percent.

2. Upon the southern army worm as a dust in a concentration of 0.125 mg. per sq. cm. of foliage the mortality after 72 hours was 97 percent.

3. Upon the cabbage looper as a dust in a concentration of 0.146 mg. per sq. cm. the mortality after 48 hours was 100 percent.

4. Pentaerythrityl bromide is also toxic to the codling moth.

Having thus described our invention, what we claim for Letters Patent is:

1. An insecticide, containing as its essential active ingredient, a pentaerythritol derivative in which the hydroxyl groups are replaced by halogen atoms of the group consisting of chlorine, bromine and iodine.

2. An insecticide, containing as its essential active ingredient, pentaerythrityl bromide.

WILLIAM GORDON ROSE.
HERBERT L. J. HALLER.